United States Patent
McInnis et al.

(10) Patent No.: US 10,053,546 B2
(45) Date of Patent: Aug. 21, 2018

(54) WATER SOLUBLE PACKAGING

(71) Applicant: Dow Global Technologies LLC, Midland, MI (US)

(72) Inventors: Christine McInnis, Blue Bell, PA (US); Britt A. Vanchura, II, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/561,248

(22) PCT Filed: Mar. 30, 2016

(86) PCT No.: PCT/US2016/024853
§ 371 (c)(1),
(2) Date: Sep. 25, 2017

(87) PCT Pub. No.: WO2016/160893
PCT Pub. Date: Oct. 6, 2016

(65) Prior Publication Data
US 2018/0051145 A1    Feb. 22, 2018

Related U.S. Application Data

(60) Provisional application No. 62/140,609, filed on Mar. 31, 2015.

(51) Int. Cl.
*C08J 5/18* (2006.01)
*B65D 65/46* (2006.01)

(52) U.S. Cl.
CPC .............. *C08J 5/18* (2013.01); *B65D 65/46* (2013.01); *C08J 2300/12* (2013.01); *C08J 2300/14* (2013.01); *C08J 2329/04* (2013.01)

(58) Field of Classification Search
CPC .................. C08J 2300/12; C08J 2300/14; C08J 2329/04; C08J 5/18; B65D 65/46
See application file for complete search history.

(56) References Cited

U.S. PATENT DOCUMENTS

| | | |
|---|---|---|
| 2,948,697 A | 8/1960 | Robertson |
| 3,300,546 A | 1/1967 | Baechtold |
| 3,892,905 A | 7/1975 | Albert |
| 2014/0110301 A1 | 4/2014 | Carrier et al. |

*Primary Examiner* — Michael C Miggins
(74) *Attorney, Agent, or Firm* — Tifani M. Edwards

(57) ABSTRACT

This invention relates to improved water soluble, polyvinyl alcohol based film packaging. More particularly, this invention relates to the use of polyvinyl alcohol based films having a defined crystalline structure, in antimicrobial packaging applications.

5 Claims, No Drawings

WATER SOLUBLE PACKAGING

This invention relates to improved water soluble, polyvinyl alcohol based film packaging. More particularly, this invention relates to the use of polyvinyl alcohol based films having a defined crystalline structure, in antimicrobial packaging applications.

Packaging materials formed from film-forming materials which are water soluble have been used for many years for packaging water soluble or dispersible dry, solid materials which may be toxic or otherwise harmful to the user or which may be difficult to weigh out in accurate portions, or simply for the convenience of the user. Examples of typical materials used in aqueous environments which have been packaged or proposed for packaging in water soluble films include, for example, cleaning products, such as laundry detergents, and caustic cleansers; pesticides, such as herbicides, fungicides, insecticides, and nematocides which are applied as aqueous sprays; and various other pulverulent water soluble or dispersible chemicals, such as carbon black, pigments, dyes, etc; food products, and the like.

One of the most widely investigated water soluble film-forming materials used or promoted for packaging of such powdery materials is polyvinyl alcohol (i.e., partially hydrolyzed polyvinyl acetate). At hydrolysis levels of up to about 97-99%, polyvinyl alcohol is soluble in water although the rates of dissolution are often too slow to be practical, especially in cold water.

Many attempts have been reported in the patent literature to improve upon the properties of water soluble polyvinyl alcohol packaging films. These efforts have included, for example, selection of special plasticizers, e.g., U.S. Pat. No. 2,948,697—J. A. Robertson; modification or copolymerization of the polyvinyl alcohol, e.g., U.S. Pat. No. 3,300,546—R. L. Baechtold; and blending polyvinyl alcohol with other polymers, e.g., U.S. Pat. No. 3,892,905—R. E. Albert.

However, none of these efforts have been entirely satisfactory in providing films which are sufficiently stable against degradation of physical properties when stored under relatively low humidity/low temperature or relatively high humidity/high temperature conditions. Thus, at low humidity/low temperature conditions, many of the films become brittle and lose elasticity, resulting in loss of impact resistance and tear strength. They may also lose their clarity and heat sealability. At high humidity/high temperature conditions (e.g., 35° C. and 80% relative humidity.) the degree of hydrolysis of the polyvinyl alcohol may increase to levels at which the polyvinyl alcohol is no longer water soluble or the film may simply become too soft and tacky to be stored or handled. The films may become water insoluble after only 2 weeks at these conditions. For this reason, it is usually necessary to store the films under specially controlled atmospheric conditions or to provide special waterproof protective release films between plies of the water soluble polyvinyl alcohol films, as shown, for example, Albert—U.S. Pat. No. 3,892,905. Many of the prior art films suffer from poor aging stability when in contact with alkaline substances, even under moderate (e.g., 50% R.H.) humidity conditions. For example, they may become water insoluble after only 2 to 3 weeks.

The present invention solves the problems of the art by providing a method for detecting a film useful for packaging that does not suffer the deficiencies of the art of tackiness, brittleness and low elasticity.

The present invention provides a water soluble, polyvinyl alcohol based film packaging comprising:

i. a sealed, water soluble polyvinyl alcohol based film; wherein water soluble polyvinyl alcohol based film is sealed around a predetermined amount of antimicrobial; and
ii. three separate crystallinity index values of greater than 5, greater than 9 and greater than 0.75, respectively.

As used herein, the "antimicrobial" means an agent that kills microorganisms or inhibits their growth; such agents may include for example, herbicides, fungicides, insecticides, and nematocides. One preferred antimicrobial that may be used with the packaging of the present invention is 2,2-dibromo-3-nitrilopropionamide or DBNPA.

As used herein, the term "crystallinity index" means the ratio of the peak height 2θ values obtained through X ray diffraction at certain 2θ values, namely Peak A: 11.6°±0.2° 2θ, Peak B: 23.3°±0.2° 2θ, and Peak C: 35.3°±0.2° 2θ to Reference Peak D 19.40°±0.35° 2θ:

As used herein, the term "packaging" means a water soluble polyvinyl alcohol based film that has been sealed around a predetermined amount of antimicrobial in solid form, for example granular, powder, liquid, pellets or tablet form to produce a dissolution packet that includes the antimicrobial. Preferably, the antimicrobial of the present invention is DBNPA. As used herein, "sealed" means the point at which the water soluble polyvinyl alcohol based film is bonded to itself. Packages may be sealed by various methods known to those of skill in the art.

As used herein, the term "water soluble polyvinyl alcohol based film" means a film that is primarily comprised of a water-soluble polyvinyl alcohol copolymer. By "primarily" is meant greater than 70%, alternatively greater than 80%, or further alternatively greater than 85% of vinyl alcohol and vinyl ester monomer. Such film compositions may include comonomers and may be manufactured in conventional manners as described in the art. One such example of a water-soluble polyvinyl alcohol film is described in US 20140110301 A1—Carrier et. al.

Surprisingly, according to the present invention it has been discovered that water soluble, polyvinyl alcohol based film packaging that comprises a water soluble, polyvinyl alcohol based film that displays three separate peaks at 2θ values from X-ray diffraction of: Peak A: 11.6°±0.2° 2θ, Peak B: 23.3°±0.2° 2θ, and Peak C: 35.3°±0.2° 2θ, respectively, will perform in a superior fashion to other polyvinyl alcohol based film packaging. While polyvinyl alcohol based film packaging is known in the art, it is often manufactured from rolls of polyvinyl alcohol copolymer that lacks consistency from one location to another within a roll and moreover lacks consistency from roll to roll. The unique and inventive aspect of the present invention is that a batch of polyvinyl alcohol based film packages may be separated out as a "good batch" simply by its crystallinity index and may be marketable as an improved and consistent product. This is currently lacking in the industry. It is envisioned that the present invention provides a method of detection of a good package wherein that method comprises using X-ray diffraction to look for specific peak height values that correspond to a presence of crystallinity. By having the ability to detect a "good package" one is then able to prepare and provide a superior packaging product to the market. By packaging product is meant a product that contains multiple packages that are sold together as a defined quantity that is greater than 1. Thus the invention provides a water soluble, polyvinyl alcohol based film packaging product comprising multiple packages wherein at least 60%, alternatively at least 70%, further alternatively at least 80%, further alternatively at least 85%, further alternatively at least 90%, and further alternatively at least 95% of the packages in the product comprise the water soluble, polyvinyl alcohol based film composition of the present invention.

Additionally, it has been discovered that perhaps even more critical than peak presence, when Crystallinity Index values for Peak A were greater than 5.0, more preferred greater than 6.0, and most preferred greater than 6.5; for Peak B greater than 9.0, more greater than 10.0, and most preferred greater than 11.5; and for Peak C greater than 0.75, more preferred greater than 0.90, and most greater than 0.95, a package having superior properties was observed. By "superior properties" is meant a package that readily dissolves in water and which is not tacky or brittle. Furthermore, this packaging may be stored for multiple week increments, at varying temperature conditions without experiencing a significant change in performance properties.

The water soluble, polyvinyl alcohol based film packaging of the present invention is useful for any purpose where water solubility is an advantage and where there is a need to disperse antimicrobials into water, preferably DBNPA into water. Suitable applications include microbial control in cooling water systems, hydrotesting waters, waters associated with the production or recycling of energy related hydrocarbons, reverse osmosis membranes, metalworking solutions, pulp and paper applications, and mineral slurries in addition to equipment and plant cleaning, paint and colorant manufacture, raw material clean up, and other applications where convenient dosing of solid DBNPA is desirable.

While it is desirable to have 100% dissolution of the water soluble, polyvinyl alcohol based film packaging, some insolubility may result due to reaction of the polyvinyl alcohol copolymer with the antimicrobial. In some embodiments, the film compositions may have a percent dissolution in water at 21° C. of at least 85%, even following exposure to an antimicrobial and aging at a temperature in the range from about 5° C. to about 54° C. for at least 4 weeks. Some embodiments may retain a percent dissolution in water at 21° C. of at least 90%, even following exposure to an antimicrobial and aging at a temperature in the range from about 30° C. to about 54° C. for at least 6 weeks, 8 weeks, 12 weeks, or longer.

EXAMPLES

Packages were formed from polyvinyl alcohol film (Ultiloc XHC-1) commercially purchased from Sekisui, Chemical Co., LTD.

XRD Experimental Conditions

A section of package was cut and affixed to a sample holder with double sided tape for X-ray diffraction (XRD) analysis. A Bruker D8 Advance θ-θ X-ray diffractometer equipped with a copper sealed-source tube and Vantec-1 linear position sensitive detector was used to collect diffraction patterns. The tube was operated at 35 kV and 45 mA and the samples were illuminated with copper $K_\alpha$ radiation (λ=1.541 Å). XRD data were collected with a 3° detector window from 5° to 45° 2θ, with a step size of 0.026° and 1 s/step collection times.

Analysis

The XRD patterns for the package samples were compared to a pattern of DBNPA powder contained in a package to determine which peaks came from the packages and which peaks came from DBNPA residue on the packages.

A broad reference peak (D) at 19.40°±0.35° 2θ was present in all package samples. Peaks at 11.6°±0.2° 2θ, 23.3°±0.2° 2θ, and 35.3°±0.2° 2θ (Peaks A-C) were not present in all samples. It was determined that the ratio of the height of these peaks to the peak height at 19.40°±0.35° 2θ (Peak D) could be used as crystallinity indices to determine the quality of the packages. Crystallinity Index A is defined as the ratio of the peak height at 11.6°±0.2° 2θ (Peak A) to the peak height at 19.40°±0.35° 2θ (Peak D). Crystallinity Index B is defined as the ratio of the peak height at 23.3°±0.2° 2θ (Peak B) to the peak height at 19.40°±0.35° 2θ (Peak D). Crystallinity Index C is defined as the ratio of the peak height at 35.3°±0.2° 2θ (Peak C) to the peak height at 19.40°±0.35° 2θ (Peak D). In instances where no peak is located at the listed peak location (i.e. bad packages), the intensity of the XRD pattern at the approximate 2θ location is used to calculate the crystallinity index instead.

Some care must be taken to ensure that peaks from the package material are being used and not peaks from the DBNPA residue, especially near 11.6°±0.2° 2θ (Peak A) and 35.3°±0.2° 2θ (Peak C). DBNPA peaks are located at 12.1±0.2° 2θ and 34.8°±0.2° 2θ. Additional DBNPA peaks are located at 18.3°±0.2° 2θ and 25.3°±0.2° 2θ and can be used to aid in identification.

Crystallinity Index A values were preferred to be greater than 5.0, more preferred to be greater than 6.0, and most preferred to be greater than 6.5. Crystallinity Index B values were preferred to be greater than 9.0, more preferred to be greater than 10.0, and most preferred to be greater than 11.5. Crystallinity Index C values were preferred to be greater than 0.75, more preferred to be greater than 0.90, and most preferred to be greater than 0.95. The results are summarized in the table below.

| Package | Package Quality | Peak Height A | Peak Height B | Peak Height C | Peak Height D | Crystallinity Index A | Crystallinity Index B | Crystallinity Index C |
|---|---|---|---|---|---|---|---|---|
| 1 | Good | 49795 | 87787 | 7729 | 9393 | 5.30 | 9.35 | 0.82 |
| 2 | Good | 58786 | 102135 | 8315 | 9197 | 6.39 | 11.11 | 0.90 |
| 3 | Bad | 4409 | 6839 | 3731 | 9645 | 0.46 | 0.71 | 0.39 |
| 4 | Bad | 4747 | 7479 | 3858 | 9468 | 0.50 | 0.79 | 0.41 |
| 5 | Bad | 3371 | 6564 | 3259 | 6518 | 0.52 | 1.01 | 0.50 |
| 6 | Bad | 25542 | 38397 | 5249 | 7686 | 3.32 | 5.00 | 0.68 |
| 7 | Bad | 7836 | 18165 | 4233 | 6363 | 1.23 | 2.85 | 0.67 |
| 8 | Good | 48911 | 85171 | 7196 | 7355 | 6.65 | 11.58 | 0.98 |
| 9 | Bad | 26776 | 35464 | 4185 | 8290 | 3.23 | 4.28 | 0.50 |

In interpreting the results good packages represent bags which remained flexible but firm, clear, and colorless. Conversely bad bags were observed to be highly elastic, wrinkly, and slightly discolored (yellowed, grey, or milky). When handling bad bags, there was the appearance that the bags may break open at any point, while the good bags felt sturdy and maintained integrity. Additionally, bad bags became tacky and when in contact with other water soluble bags were difficult to separate.

Of note about the data is: Packages 1-7 were formed from the same roll of film, further highlighting that inconsistencies in the film manufacture exist. Packages 8 & 9 were also from the same roll of film, but were taken in close proximity to each other.

The invention claimed is:

1. A water soluble, polyvinyl alcohol based film packaging comprising:
   i. a sealed, water soluble polyvinyl alcohol based film; wherein water soluble polyvinyl alcohol based film is sealed around a predetermined amount of antimicrobial; and
   ii. three separate crystallinity index values of greater than 5, greater than 9 and greater than 0.75, respectively.

2. The use of the water soluble, polyvinyl alcohol based film packaging of claim 1 in cooling water systems, hydrotesting waters, waters associated with the production or recycling of energy related hydrocarbons, reverse osmosis membranes, metalworking solutions, pulp and paper applications, and mineral slurries in addition to equipment and plant cleaning, paint and colorant manufacture, and raw material clean up applications.

3. A water soluble, polyvinyl alcohol based film packaging product comprising multiple packages wherein at least 60% of the packages comprise the packaging of claim 1.

4. The water soluble, polyvinyl alcohol based film packaging of claim 1 comprising an antimicrobial that is 2,2-dibromo-3-nitrilopropionamide.

5. The use of the water soluble, polyvinyl alcohol based film packaging of claim 4 in cooling water systems, hydrotesting waters, waters associated with the production or recycling of energy related hydrocarbons, reverse osmosis membranes, metalworking solutions, pulp and paper applications, and mineral slurries in addition to equipment and plant cleaning, paint and colorant manufacture, and raw material clean up applications.

* * * * *